No. 785,751. PATENTED MAR. 28, 1905.
G. W. MORSE.
APPARATUS FOR THE MANUFACTURE OF FELT.
APPLICATION FILED JAN. 23, 1903.
2 SHEETS—SHEET 1.
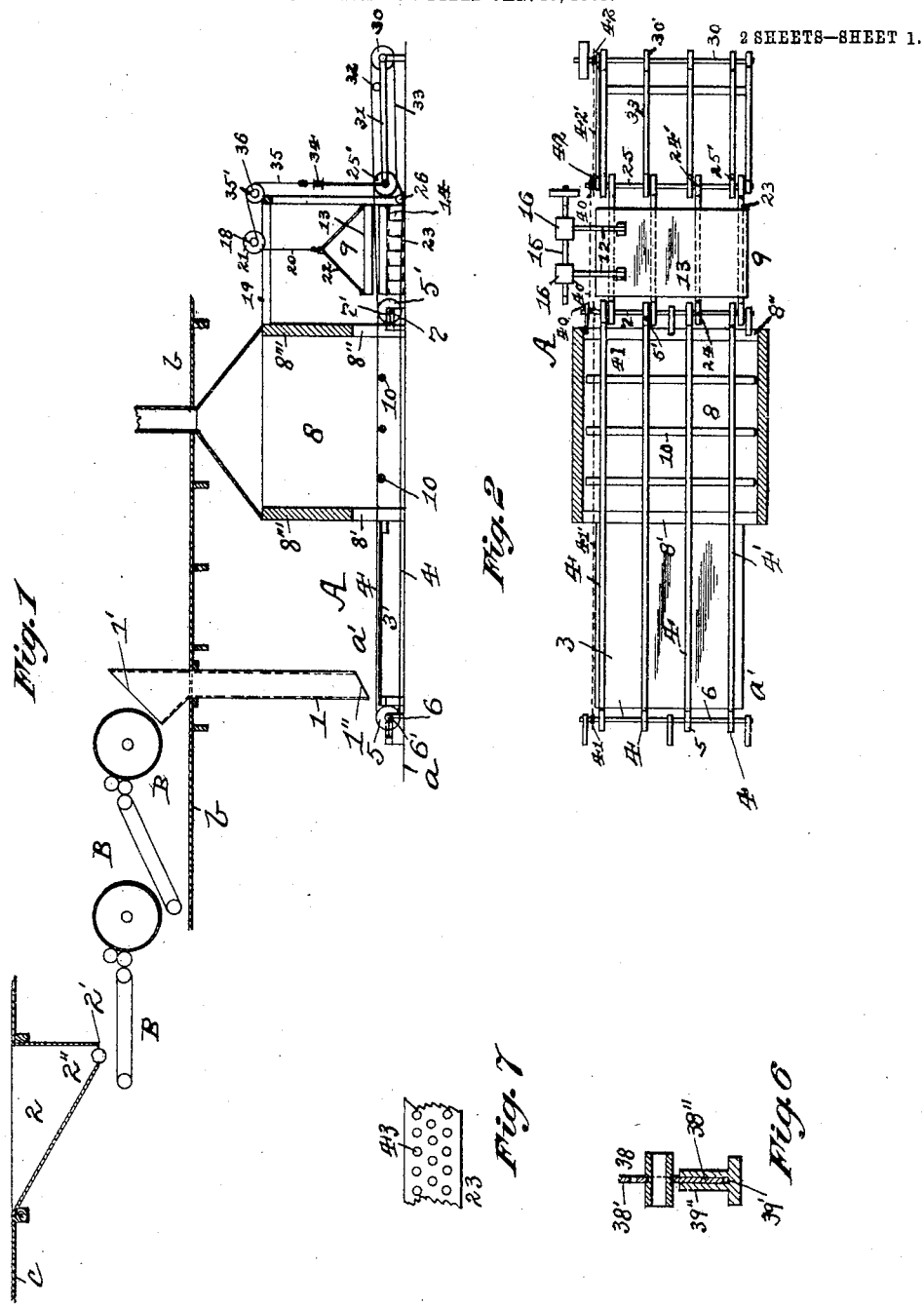

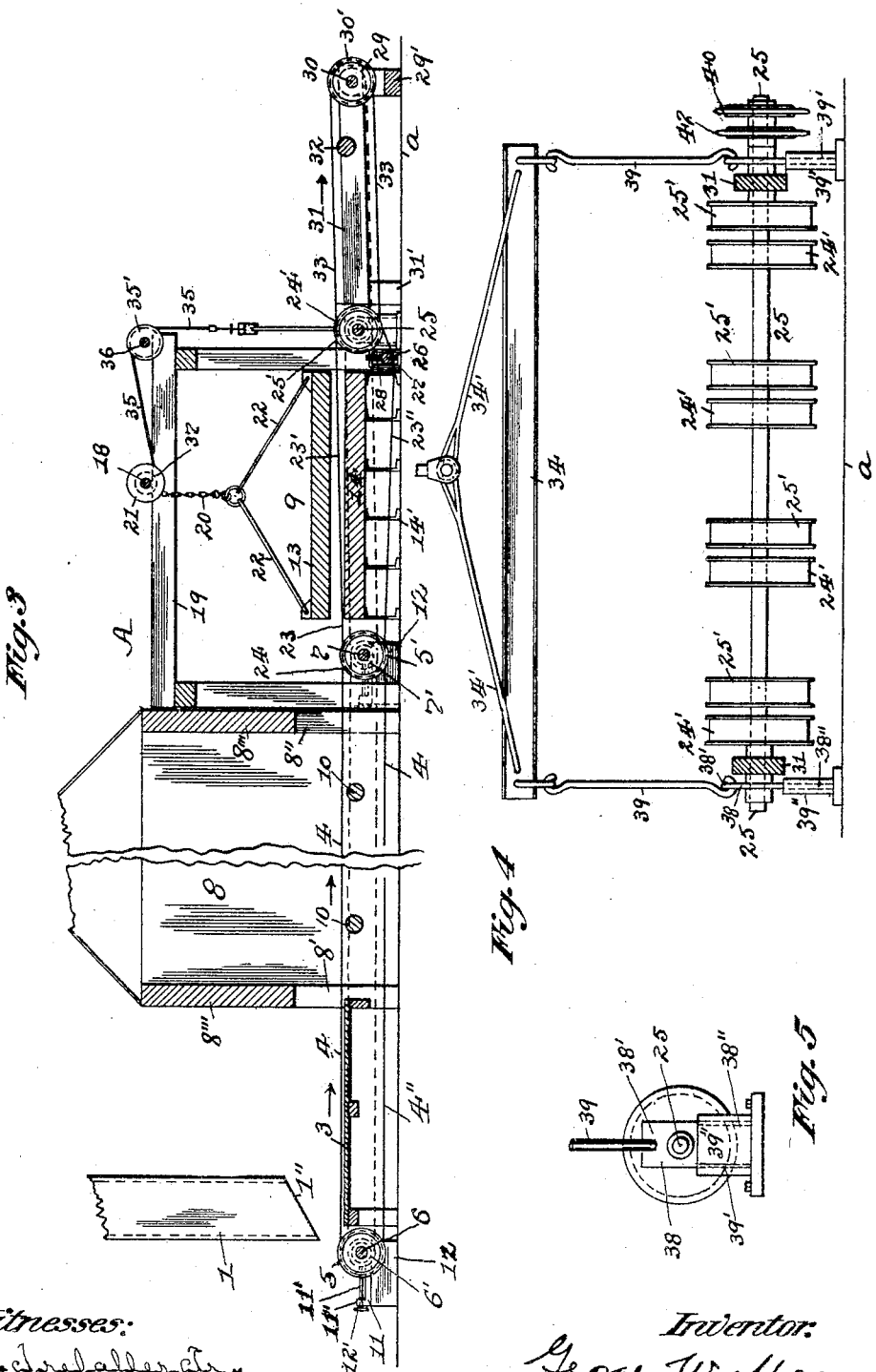

No. 785,751. Patented March 28, 1905.

UNITED STATES PATENT OFFICE.

GEORGE W. MORSE, OF PITTSBURG, PENNSYLVANIA, ASSIGNOR TO HIRAM W. FRENCH COMPANY, OF ALLEGHENY, PENNSYLVANIA, A CORPORATION OF PENNSYLVANIA.

APPARATUS FOR THE MANUFACTURE OF FELT.

SPECIFICATION forming part of Letters Patent No. 785,751, dated March 28, 1905.

Application filed January 23, 1903. Serial No. 140,265.

*To all whom it may concern:*

Be it known that I, GEORGE W. MORSE, a resident of Pittsburg, in the county of Allegheny and State of Pennsylvania, have invented a new and useful Improvement in Apparatus for the Manufacture of Felt; and I do hereby declare the following to be a full, clear, and exact description thereof.

My invention relates to apparatus for the manufacture of felt, and has special reference to the manufacture of cattle-hair felt.

The object of my invention is to provide for the manufacture of felt in a cheap and simple manner, so that such felt can be made in a continuous sheet and of any desired length required, while at the same time doing away with a certain amount of labor, expense, and various articles usually required in the manufacture of felt by the ordinary approved methods of manufacture at present employed.

My invention consists, generally stated, in the novel arrangement, construction, and combination of apparatus for manufacturing felt hereinafter more specifically set forth and described, and particularly pointed out in the claims.

To enable others skilled in the art to which my invention appertains to practice and use my improved apparatus for manufacturing felt, I will describe the same more fully, referring to the accompanying drawings, in which—

Figure 1 is a diagrammatical side elevation of a plant, partly in section, suitable for practicing my invention. Fig. 2 is a plan or top view of a portion of the same. Fig. 3 is an enlarged longitudinal central section of the machine or portion shown in Fig. 2. Fig. 4 is an enlarged cross-section of the machine shown in Figs. 2 and 3 and illustrating the manner of raising the felt. Fig. 5 is an enlarged detail side view of the bearing employed in the raising of the felt. Fig. 6 is a section through one of the bearings through which the belts and felt are raised and lowered. Fig. 7 is a view of another form of belt.

Like letters or symbols of reference herein indicate like parts in each of the figures of the drawings.

In the plant or apparatus illustrated for carrying out my improved method of making felt, A represents the felting apparatus proper, which is generally placed upon the ground-floor $a$ of the factory, and to the receiving end $a'$ of this apparatus leads a feeding chute or pipe 1, which extends down from the floor $b$ above the ground floor $a$ and has its hopper or mouth 1' extending above said floor $b$. Mounted on said floor $b$ is the picking and carding machine B, which is adapted to feed the fibrous material into the mouth 1' of the pipe 1, and such material is fed from the floor $c$ above the floor $b$ by any suitable means into the receptacle 2, depending from said floor $c$, from which it is fed to the picking and carding machine B through an opening 2' in said receptacle 2, and within which opening is located a power-driven agitating-roller 2''.

The delivery end 1'' of the feeding-pipe 1 opens over a table 3 at the receiving end $a'$ of the felting apparatus A, and over this table travel a series of endless belts 4, which are preferably formed of thin metal strips, so as to pass over and around pulleys 5 5' at each end of the belts 4, the pulleys 5 being mounted on a power-driven shaft 6, journaled in bearings 6' at the outer end of the table 3, and the pulleys 5' being mounted on a power-driven shaft 7, journaled in bearings 7', located between a steam-box 8 and the felter 9. This steam-box 8 is located between the inner end of the table 3 and the felter 9 and is inclosed over the belts 4, and such belts are adapted to travel through openings 8' 8'', formed in the ends 8''' of said steam-box 8. The steam-box 8 is supplied with steam in any suitable manner, and extending across the same are the supporting-rollers 10, which are located between the upper and lower portions 4' 4'', respectively, of said belts 4 and act to support the carrying of said upper portion 4' during its movement through said box 8. The bearings 6' and 7' for the shafts 6 and 7, respectively, are mounted upon and are adapted to slide upon the bearing-blocks 11, which are secured upon the supports 12, and such bearings 6' and 7' are adapted to be moved by means of the screw-bars 11', which are secured to such bearing 6' 7' and engage with threaded openings or holes formed in projections 11" on the bearing-blocks 11 and are provided with heads 12' for turning the same to move said shafts 6 and 7 to and from each other in adjusting the belts 4 on the pulleys 5 5', mounted on said shafts.

The felter 9 is composed of the upper felter-platen 13 and the lower felter-platen 14, the latter of which is stationary and mounted upon the standards 14', supported on the floor $a$, while the platen 13 is connected to a power-driven shaft 15 and is adapted to be reciprocated by means of eccentrics 16 on said shaft, which are connected pivotally to the upper platen 13 by the eccentric-rods 17. The upper felter-platen 13 is adapted to be raised and lowered over the lower platen 14 through the power-shaft 18, supported above the platen 14 on the frame 19, and through the medium of the ropes or chains 20, passing around drums 21 on this shaft 18 and connected to rods 22, pivotally connected to said platen 13. A series of endless belts 23, the carrying or upper portion 23' of which pass between the platens 13 14, is provided, and such belts are preferably formed of thin metal strips, so as to pass over and around pulleys 24 24' at each end of the belts 23, the pulleys 24 being mounted on the power-driven shaft 7 and the pulleys 24' are mounted upon the power-driven shaft 25, which is mounted beyond the frame 19 and is adapted to be raised and lowered, as hereinafter described. An idle roller 26 is mounted in a bearing 27, located at each end thereof on the floor $a$, and such roller is adapted to bear against the upper face of the lower portion 23" of the belts 23 for the purpose of taking up any slack in said belts. A spiral spring 28 is located in each of said bearings 27, which is adapted to be held between the bearing and roller 26 for the purpose of holding said roller in position against the belts 23, and such spring being adjusted in any suitable manner.

Mounted in bearings 29 on the floor $a$, beyond the power-driven shaft 25, is the power-driven shaft 30, and such shaft 30, with its bearing 29, is supported on the stand 29' at each end thereof, resting upon the floor $a$. Side frames 31 can be connected to the shafts 25 and 30 or to the shaft 30 and stand 31', or, as preferred, between the stands 29' and 31', and between these frames 31 extends the idle or grinding roller 32 for supporting the upper or carrying portion of the endless belts 33, which pass over and around pulleys 25' and 30', located on the shafts 25 and 30, respectively.

The device or apparatus for raising and lowering the power-driven shaft 25 consists of the frame or beam 34, which is hung from the frame 19 by means of a rope or chain 35, which is connected to said beam 34 by rods 34' and passes over a pulley or drum 35', located on a shaft 36, mounted on said frame 19, and around a drum 37, located on the shaft 18. Mounted around each end of the shaft 25 is the plate 38, to the upper ends 38' of which are loosely connected the rods 39, which are in turn loosely connected to the beam 34, located above the same, and the lower ends 38" of these plates 38 are adapted to slide or move within slots 39', formed in bearings or blocks 39", located on the floor $a$.

The shafts 25 and 7 are operated together through the medium of sprocket-wheels 40 therein, around which passes the sprocket-chain 40', and the shafts 6 and 7 are operated together through the medium of the sprocket-wheels 41 thereon, around which passes the sprocket-chain 41', while the shafts 25 and 30 are operated together through the medium of the sprocket-wheels 42 thereon, around which passes the sprocket-chain 42', the power being applied to the shaft 30 or to any one of these shafts as desired and at the proper time for moving the material and product as soon as a certain portion is felted by the felter 9.

The manner of operating the plant or apparatus for making felt is as follows: The cattle-hair or other fibrous material is fed through the opening 2' in the receptacle 2 by the roller 2" into the picking and carding machine B, and from which it is fed into the feeding-pipe 1 through its mouth 1', the said pipe 1 allowing said material to drop down onto the table 3 and belts 4, where the same can be formed into a mass or bat of the height required by hand or other means desired, and such feeding of the material to form the mass or bat is carried on continuously. Power being applied to the shaft 30, it will act to move the belts 4, 23, and 33 forward in the direction of the arrow through the medium of the chains 42', 40', and 41', passing around the sprocket-wheels 42, 40, and 41 on the shafts 30, 25, 7, and 6, and such material on the belt 4 will be carried along the table 3 by said belts 4 through the openings 8' into the steam-box 8. The belts 4, 23, and 3 3 are again caused to move, which will carry said steamed portion out through the opening 8" in the steam-box on the belts 4 onto the belts 23, and thence the material is carried by said belts 23 between the platens 13 and 14 of the felter 9 and over the lower platen 14, while at the same time another portion of said material, which is continuously fed onto the table 3 by the pipe 1, is carried by the belts 4 into the steam-box 8 to be steamed therein. After this is accomplished the belts 4, 23, and 33 are stopped and the upper felter-platen 13 lowered onto the said material by the power-driven shaft 18 and the chains 20, connecting the drums 21 on this shaft with the said platen 13, when power can then be applied to the shaft 15, which will act to move the said platen 13 in a reciprocating movement through the medium of the eccentrics 16 on said shaft 15, connecting said platen by the rods 17, and so felt that portion of the material between the platens 13 and 14. After the material has thus been sufficiently felted by the felter 9 the movement of the upper felter-platen 13 is stopped, and such platen 13 and the felted portion of said material are raised at the same time by power applied to the shaft 18, which will act to raise said platen 13 through the medium of the chains 20 on the drum 21 and connected to said platen 13 and through the medium of the chain 35, connecting the frame-beam 34 and passing over the drum 35' and around the drum 37 on said shaft 18. The frame-beam 34 being also connected by the rods 39 with the plates 38 on the shaft 25 will also act to raise said shaft 25 and the plates 38 within the slots 39' in the blocks 39", together with the belts 23 and 33, passing around the pulleys 24' and 25', respectively, on said shaft 25, and thereby enabling said belts 23 to lift or raise said felted portion of said material from off the lower felter-platen 14. The belts 4, 23, and 33 can then be caused to move, which will enable said felted portion to be carried off the belts 33, while at the same time the portion of said material being steamed within the box 8 will be carried along from said belts 4 onto the belts 23 and under said raised platen 13, while another portion of said material, which is continuously fed onto the table 3 by the pipe 1, is carried by the belts 4 into the steam-box to be steamed therein. The belts 4, 23, and 33 are then stopped, and the upper platen 13 and the shaft 25 with the belts 23 and 33 thereon are lowered by means of the shaft 18, so that another portion of said material can be felted on said belts 23 and platen 14 of the felter 9 by the reciprocating movement of the platen 13, and the previously-felted portion of said material can be rolled upon said belts 33. These operations can be repeated and the felt rolled upon said belts 33 until the desired length of felt is obtained, when the said felt can be severed from the main body and carried onto any suitable table for trimming the sides thereof, after which such felt can be rolled up, dried, and packed ready for shipment or use.

It will be evident that the belts 23 can be provided with perforation 43 of any suitable design or shape, such as is shown in Fig. 7, for forming projections on the bottom of the felt during the operation of the felter 9 and that the under face of the upper platen 13 can be provided with indentations or projections of any desired shape or form, so as to form like shapes or projections on the upper face of the felt during its formation by said felter. These and various other modifications and changes in the carrying out of my improved method of manufacturing felt may be resorted to without departing from the spirit of the invention or sacrificing any of its advantages. It will further be obvious that my improved apparatus for manufacturing felt can be used in the making of other kinds of felt than that from cattle-hair, such as wool-felt, and that various forms of machines or apparatus can be used in practicing such method. It will also be obvious, and practical experience has proven, that my improved method of making felt in continuous sheets will do away with the usual running over or second felting of the felt formed by another felter, as in the ordinary methods of manufacture, and at the same time will also do away with the use of burlaps, cloths, and aprons generally employed in this class of work, thereby dispensing with labor and machinery to cheapen the cost of manufacture and also forming a stronger, more compact, and better piece of felt.

What I claim as my invention, and desire to secure by Letters Patent, is—

1. In apparatus for the manufacture of felt, the combination of the felter, and means for raising the felt within the felter and withdrawing the same therefrom.

2. In apparatus for the manufacture of felt, the combination of the felter, means for raising the felter, and means for raising the felt within the same to permit the latter to be withdrawn from said felter.

3. In apparatus for the manufacture of felt, the combination of the felter composed of upper and lower platens, means for raising the upper platen and means for raising the felt from the lower platen to permit the latter to be withdrawn from said felter.

4. In apparatus for the manufacture of felt, the combination of the felter, means for carrying the material to and within the felter to be felted, and means for raising said carrying means within the felter to permit the felt to be withdrawn from said felter after being felted.

5. In apparatus for the manufacture of felt, the combination of the felter, means for carrying the material to and within the felter to be felted, means for raising the felter, and means for raising said carrying means within the felter to permit the felt to be withdrawn from said felter after being felted.

6. In apparatus for the manufacture of felt, the combination of the felter composed of upper and lower platens, means for carrying the material to and between the platens to be felted, means for raising the upper platen, and means for raising the carrying means within the felter to permit the felt to be withdrawn from above the lower platen after being felted.

7. In apparatus for the manufacture of felt, the combination of the felter, a series of belts for carrying the material to and within the felter to be felted, and means for raising said belts within the felter to permit the felt to be withdrawn from said felter after being felted.

8. In apparatus for the manufacture of felt, the combination of the felter, a series of belts for carrying the material to and within the felter to be felted, means for raising the felter, and means for raising said belts within the felter to permit the felt to be withdrawn from said felter after being felted.

9. In apparatus for the manufacture of felt, the combination of the felter composed of upper and lower platens, a series of belts carrying the material to and between the platens to be felted, means for raising the upper platen, and means for raising said belts within the felter to permit the felt to be withdrawn from above the lower platen after being felted.

10. In apparatus for the manufacture of felt, the combination of the felter composed of upper and lower platens, a series of endless belts passing around shafts on each side of said felter for carrying the material to and between the platens to be felted, connections between said upper platen and belt-shafts for raising said upper platen, and means for raising said belts to permit the felt to be raised from the lower platen so that said felt can be withdrawn from said felter after being felted.

11. In apparatus for the manufacture of felt, the combination of the felter composed of upper and lower platens, a power-shaft supported above said upper platen, a series of endless belts passing around shafts on each side of said felter for carrying the material to and between the platens to be felted, connections from said power-shaft to the upper platen and the belt-shafts for raising said platen, and means for raising said belts to permit the felt to be raised from the lower platen so that said felt can be withdrawn from said felter after being felted.

12. In apparatus for the manufacture of felt, the combination of the felter composed of upper and lower platens, a supporting-frame above said felter, a power-shaft carrying drums on said frame, a pulley on said frame, a series of endless belts passing around shafts on each side of said felter for carrying the material to and between the platens to be felted, chains passing from said drums to said upper platen and over said pulley to the belt-shafts for raising said platen, and chains passing from said drums for raising said belts to permit the felt to be raised from the lower platen so that said felt can be withdrawn from said felter after being felted.

In testimony whereof I, the said GEORGE W. MORSE, have hereunto set my hand.

GEORGE W. MORSE.

Witnesses:
J. N. COOKE,
JOHN EDGAR DETWEILER.